United States Patent
Edahiro

(10) Patent No.: US 11,279,857 B2
(45) Date of Patent: Mar. 22, 2022

(54) ADHESIVE TAPE

(71) Applicant: TERAOKA SEISAKUSHO CO., LTD., Tokyo (JP)

(72) Inventor: Takashi Edahiro, Tokyo (JP)

(73) Assignee: TERAOKA SEISAKUSHO CO., LTD., Tokyo (JP)

( * ) Notice: Subject to any disclaimer, the term of this patent is extended or adjusted under 35 U.S.C. 154(b) by 0 days.

(21) Appl. No.: 16/615,728

(22) PCT Filed: May 23, 2017

(86) PCT No.: PCT/JP2017/019249
§ 371 (c)(1),
(2) Date: Nov. 21, 2019

(87) PCT Pub. No.: WO2018/216114
PCT Pub. Date: Nov. 29, 2018

(65) Prior Publication Data
US 2020/0208017 A1 Jul. 2, 2020

(51) Int. Cl.
*B32B 7/02* (2019.01)
*C09J 7/25* (2018.01)
*C09J 7/30* (2018.01)

(52) U.S. Cl.
CPC . *C09J 7/25* (2018.01); *C09J 7/30* (2018.01); *C09J 2409/00* (2013.01); *C09J 2423/046* (2013.01); *C09J 2423/106* (2013.01); *C09J 2433/00* (2013.01); *C09J 2467/006* (2013.01); *C09J 2479/086* (2013.01); *C09J 2481/006* (2013.01)

(58) Field of Classification Search
CPC .... C09J 123/00; C09J 133/04; C09J 2203/33; C09J 2301/312; C09J 2409/00; C09J 2421/00; C09J 2423/046; C09J 2423/106; C09J 2433/00; C09J 2467/006; C09J 2479/086; C09J 2481/006; C09J 2483/00; C09J 7/22; C09J 7/25; C09J 7/30; B32B 7/02
See application file for complete search history.

(56) References Cited

U.S. PATENT DOCUMENTS

| | | | | |
|---|---|---|---|---|
| 2011/0306677 A1* | 12/2011 | Kataoka | ............ | C09J 7/381 514/729 |
| 2012/0219835 A1* | 8/2012 | Kawabe | ............ | H01M 10/0587 429/94 |
| 2015/0291859 A1 | 10/2015 | Takamura et al. | | |

FOREIGN PATENT DOCUMENTS

| | | |
|---|---|---|
| JP | H09165557 A | 6/1997 |
| JP | 2012072362 A | 4/2012 |
| JP | 2012226992 A | 11/2012 |
| JP | 2013064086 A | 4/2013 |
| JP | 2013140765 A | 7/2013 |
| JP | 5639733 B2 | 12/2014 |
| JP | 2015196832 A | 11/2015 |
| JP | 2017008189 A | 1/2017 |
| JP | 2017052835 A | 3/2017 |
| WO | 2013133167 A1 | 9/2013 |
| WO | 2014069356 A1 | 5/2014 |

OTHER PUBLICATIONS

International Search Report (ISR) dated Aug. 8, 2017, issued for International application No. PCT/JP2017/019249. (2 pages).

* cited by examiner

*Primary Examiner* — Lawrence D Ferguson
(74) *Attorney, Agent, or Firm* — Law Office of Katsuhiro Arai

(57) ABSTRACT

A thin adhesive tape includes a base and an adhesive layer provided on one surface of the base, wherein the base has a thickness of 2 to 25 μm, the adhesive layer has a thickness of 0.1 to 10 μm, the adhesive tape has a thickness of 30 μm or less, the adhesive tape has a peel adhesion of 0.50 N/10 mm or more in accordance with JIS Z 0237:2000, and the adhesive tape has a strength to repel members calculated by the following formula of 70 MPa·mm or less, the adhesive tape being excellent in a balance between fixability of members and followability to members:

Strength to repel members (MPa·mm)=tensile elastic modulus (MPa) of adhesive tape×thickness (mm) of adhesive tape.

6 Claims, No Drawings

ADHESIVE TAPE

CROSS-REFERENCE TO RELATED APPLICATIONS

This application is the U.S. National Phase under 35 U.S.C. § 371 of International Application PCT/JP2017/019249, filed May 23, 2017. The International Application was published under PCT Article 21(2) in a language other than English.

TECHNICAL FIELD

The present invention relates to an adhesive tape, more specifically relates to a thinned adhesive tape that can contribute to miniaturization of various products (for example, batteries) that require miniaturization by being used in such products.

BACKGROUND ART

Conventionally, an adhesive tape is used for various purposes such as core fixing, insulation of electrode outlet, end fixing and insulation spacer in secondary batteries such as a lead storage battery, a nickel-cadmium battery, a nickel hydrogen battery and a lithium ion battery. Secondary batteries can be produced, for example, by fixing a device with an adhesive tape, then, inserting a group of electrodes into a battery case, and enclosing an electrolytic solution.

Patent Document 1 describes an adhesive tape for secondary battery having an adhesive layer containing a rubber component composed of polyisobutylene rubber and/or butyl rubber and a saturated hydrocarbon resin as the main component and having a dry thickness of 10 to 50 μm on a polypropylene film base having a thickness of 30 to 300 μm. It is described that this adhesive tape is stable against an electrolytic solution and the output of the battery can be maintained at a high level for a long period of time.

Patent Document 2 describes an adhesive tape for battery having an adhesive layer on at least one surface of a base and showing specific thickness change rate and specific peel adhesion, and it is described that the thickness of the base is 8 to 100 μm and the thickness of the adhesive layer is 2 to 100 μm. Additionally, it is described that this adhesive tape does not cause a lowering of the property of an electrolytic solution, does not cause breakage by pressure of positive and negative electrode active materials and separators, does not cause a lowering of adhesion between a current collector and an active material, and further can improve suitability to pack electrodes into a battery case.

Patent Document 3 describes an adhesive tape for electrode plate protection that has an adhesive layer on at least one surface of a base and exhibits a specific pierce resistance and a specific heat shrinkage rate, and it is described that the thickness of the base is 8 to 100 μm and the thickness of the adhesive layer is 2 to 20 μm. Further, it is described that this adhesive tape does not break even if a burr contacts with the tape, and can maintain a short-circuit preventing effect without peeling from the electrode plate even at high temperatures.

Patent Document 4 describes an adhesive tape for battery that has an adhesive layer laminated on at least one surface of a base by 0.5 mm or more inside from both side edge portions, and that exhibits a specific peel adhesion and a specific displacement distance, and it is described that the thickness of the base is 8 to 100 μm and the thickness of the adhesive layer is 1 to 45 μm. Further, it is described that this adhesive tape can suppress the deterioration of an electrolytic solution caused by the paste protruding from the base.

Patent Document 5 describes an adhesive tape having a specific acrylic adhesive layer on at least one surface of a substrate, and it is described that the thickness of the base is 8 to 100 μm and the thickness of the adhesive layer is 1 to 45 μm. Further, it is described that this adhesive tape can be easily attached to battery constituent members at ordinary temperature and can maintain excellent adhesiveness inside a non-aqueous battery.

Patent Document 6 describes an adhesive tape for electrochemical device having an acrylic adhesive layer having a thickness of 1 to 15 μm on at least one surface of a plastic base and exhibiting a specific gel fraction and a specific water absorption rate, and it is described that the thickness of the base is 8 to 100 μm. Further, it is described that this adhesive tape has a very low water content, hardly causes paste protrusion, and does not peel off even when it comes into contact with an electrolytic solution.

By the way, in recent years, along with miniaturization of devices such as unmanned aircrafts typified by drones and terminals typified by wearable terminals, the size of batteries has been reduced, and the surface of the electrode group and the space inside the battery case have also become smaller. Hence, an adhesive tape used for a battery is also required to be thin while maintaining safety.

In Patent Documents 1 to 6 described above, however, the problems peculiar to thinned adhesive tapes are not solved.

PRIOR ART DOCUMENTS

Patent Documents

Patent Document 1 JP 9-165557
Patent Document 2 JP 2013-140765
Patent Document 3 JP 2012-072362
Patent Document 4 JP 2013-064086
Patent Document 5 WO2013/133167
Patent Document 6 JP 2012-226992

SUMMARY OF INVENTION

Technical Problem

According to findings of the present inventors, the thinned adhesive tape, for example, when it is affixed for the purpose of protecting the electrode plate of the battery or fixing the end of the electrode group, may not sufficiently maintain the fixed state to the affixed surface and may peel off in some cases. If the adhesive tape peels off, the insulation cannot be maintained and the safety of the battery may possibly be lowered. In addition, since the electrode group to which the adhesive tape is affixed is subsequently overlapped, wound or bent, if the stiffness of the adhesive tape is too strong, it may possibly peel off by repulsion.

The present inventors have paid attention particularly to a problem of balance between an ability to maintain the state wherein an adhesive tape affixed to a member is sufficiently fixed to the affixing surface (fixability of members) and an ability of an adhesive tape to flexibly follow deformation even when a member affixed with the adhesive tape is deformed (followability to members), as a specific problem that occurs in the thinned adhesive tape, as described above. That is, the present invention has an object of providing a thinned adhesive tape excellent in a balance between the fixability of members and the followability to members.

Solution to Problem

The present inventors have intensively studied to attain the above-described object and resultantly found that the above-described problems hardly occur even if the adhesive tape is thinned, when the thicknesses of the base and the adhesive layer are set in suitable ranges, and additionally, when the peel adhesion and the strength to repel members of the adhesive tape are adjusted in suitable ranges, leading to completion of the present invention.

That is, the present invention is an adhesive tape comprising a base and an adhesive layer provided on one surface of the base, wherein the base has a thickness of 2 to 25 µm, the adhesive layer has a thickness of 0.1 to 10 µm, the adhesive tape has a thickness of 30 µm or less, the adhesive tape has a peel adhesion of 0.50 N/10 mm or more in accordance with JIS Z 0237:2000, and the adhesive tape has a strength to repel members of 70 MPa·mm or less calculated by the following formula.

Strength to repel members (MPa·mm)=tensile elastic modulus (MPa) of adhesive tape×thickness (mm) of adhesive tape

Advantageous Effects of Invention

The adhesive tape of the present invention can contribute to miniaturization of various products (for example, batteries) that are required to be miniaturized, since the tape is thin. Moreover, in the present invention, a balance between fixability of members and followability to members can be improved by setting the thicknesses of the base and the adhesive layer within suitable ranges and additionally setting the peel adhesion and the strength to repel members of the adhesive tape within suitable ranges. Hence, the adhesive tape of the present invention is very useful for various products (for example, batteries) requiring the properties.

MODES FOR CARRYING OUT THE INVENTION

[Base]

The thickness of the base of the adhesive tape of the present invention is 2 to 25 µm, preferably 3.5 to 20 µm, more preferably 4 to 15 µm, particularly preferably 6 to 12 µm. By reducing the thickness of the base in this way, it becomes possible to thin the adhesive tape. In addition, followability to members is also improved, since the strength to repel members of the adhesive tape can be adjusted to a relatively low level.

The kind of the base is not specifically limited, and various bases known to be usable for an adhesive tape can be used. In particular, a plastic film is preferable. Specific examples thereof include polyolefin films such as a polyethylene film and a polypropylene film; polyester films such as a polyethylene terephthalate film and a polybutylene terephthalate film; polyphenylene sulfide films, polyimide films and polyamide films. Of them, polyolefin films, a polyethylene terephthalate film, polyphenylene sulfide films and polyimide films are preferable, and particularly from the standpoint of heat resistance and chemical resistance suitable for battery applications, a polypropylene film, a polyethylene terephthalate film, polyphenylene sulfide films and polyimide films are more preferable. The base may be subjected to a treatment such as a corona treatment, a plasma treatment, a flame treatment and an anchoring agent treatment, as necessary.

Even if the base has the same thickness, the stiffness of the base is different if the material of the base is different. Therefore, the preferred thickness of the base is slightly different for each type of the material. For example, the preferable thicknesses of polyolefin films, polyester films and polyphenylene sulfide films are 2 to 25 µm, and the preferable thickness of polyimide films is 2 to 12 µm.

[Adhesive Layer]

The thickness of the adhesive layer of the adhesive tape of the present invention is 0.1 to 10 µm, preferably 0.2 to 8 µm, more preferably 0.5 to 6 µm. By reducing the thickness of the adhesive layer in this way, it becomes possible to thin the adhesive tape. Even if the adhesive layer is so thin, the adhesive tape of the present invention has a sufficient peel adhesion (to be described in detail later), so that problems regarding fixability of members are less likely to occur.

As the adhesive constituting the adhesive layer, for example, a rubber-based adhesive, an acrylic adhesive and a silicone-based adhesive can be used. These may be used in admixture of two or more.

The kind of the rubber-based adhesive is not particularly restricted, and various known rubber-based adhesives containing a rubber component as the main component can be used. Specific examples of the rubber component include synthetic rubbers such as butyl rubber, polyisobutylene rubber, isoprene rubber, styrene-isobutyrene-styrene block copolymer, styrene-isoprene block copolymer, styrene-butadiene rubber, styrene-isoprene-styrene block copolymer, styrene-butadiene-styrene block copolymer, styrene-ethylene-butyrene-styrene block copolymer, styrene-ethylene-propylene-styrene block copolymer and styrene-ethylenepropylene block copolymer; and natural rubbers. Two or more rubber components may be used together. Particularly, synthetic rubbers are preferable, and butyl rubber, polyisobutylene rubber or mixture thereof are more preferable, from the standpoint of properties such as heat resistance, chemical resistance, weathering resistance and insulation. Butyl rubber is generally a rubber containing, as the main component, a copolymer composed of isobutylene and 1 to 3% by mass of isoprene.

When a rubber-based adhesive is used in an adhesive layer, it is preferable that an adhesive composition constituting the adhesive layer contains a saturated hydrocarbon resin together with the rubber-based adhesive. The saturated hydrocarbon resin is a hydrocarbon resin having no unsaturated bond, and is a component for improving adhesion of the adhesive layer. Since the saturated hydrocarbon resin is a resin constituted only of a saturated hydrocarbon, when the adhesive tape is used, for example, at a site to be immersed in an electrolytic solution in a secondary battery or a site that may come into contact with an electrolytic solution in a secondary battery, the adhesive tape hardly causes a decomposition reaction even under high voltage and high energy during repeated charging and discharging, and has excellent stability.

The kind of the saturated hydrocarbon resin is not particularly restricted, and foe example, various alicyclic or aliphatic saturated hydrocarbon resins known as a tackifier can be used. Two or more saturated hydrocarbon resins may be used together. Particularly, alicyclic saturated hydrocarbon resins are preferable, and hydrocarbon resins from which unsaturated bonds have been eliminated by a hydrogenation treatment are more preferable. As the saturated hydrocarbon resin, hydrogenated petroleum resins are commercially available. The hydrogenated petroleum resin is a resin obtained by a hydrogenation treatment of a petroleum resin (for example, aromatic petroleum resins, aliphatic petroleum resins, copolymerized petroleum resins composed of an alicyclic component and an aromatic component). Of them, hydrogenated petroleum resins obtained by a hydrogenation treatment of aromatic petroleum resins (alicyclic saturated hydrocarbon resins) are preferable. The preferred hydrogenated petroleum resins are commercially available (for example, manufactured by Arakawa Chemical Industries, Ltd., ARKON (registered trademark) P-100). The content of the saturated hydrocarbon resin is preferably 0.01 to 100 parts by mass, more preferably 0.01 to 80 parts by mass, particularly preferably 0.01 to 50 parts by mass, with respect to 100 parts by mass of the adhesive component. If the content of the saturated hydrocarbon resin is large, the adhesion is further improved.

The kind of the acrylic adhesive is not particularly restricted, and various known acrylic adhesives containing an acrylic copolymer as the main component can be used. As the acrylic copolymer, for example, acrylic copolymers obtained by copolymerizing a (meth)acrylic acid ester, a carboxyl group-containing monomer and, if necessary, other monomers can be used. Specific examples of the (meth) acrylic acid ester include methyl (meth)acrylate, ethyl (meth)acrylate, n-propyl (meth)acrylate, isopropyl (meth) acrylate, n-butyl (meth)acrylate, isobutyl (meth)acrylate, 2-ethylhexyl (meth)acrylate, octyl (meth)acrylate, isooctyl (meth)acrylate, nonyl (meth)acrylate, isononyl (meth)acrylate and lauryl (meth)acrylate. Specific examples of the carboxyl group-containing monomer include (meth)acrylic acid, itaconic acid, crotonic acid, (anhydrous) maleic acid, fumaric acid, 2-carboxy-1-butene, 2-carboxy-1-pentene, 2-carboxy-1-hexene and 2-carboxy-1-heptene. Specific examples of the other monomers include hydroxyl group-containing monomers such as 2-hydroxyethyl (meth)acrylate, 3-hydroxypropyl (meth)acrylate and 4-hydroxybutyl (meth)acrylate; acrylonitrile, styrene, 2-methylolethylacrylamide, vinyl acetate and acryloylmorpholine.

The acrylic copolymer is preferably in particular an acrylic copolymer (A) having a hydroxyl group and a carboxyl group, which contains, as the constitutional component, a (meth)acrylic acid alkyl ester (A1) having an alkyl group having a number of carbon atoms of 4 to 12, a carboxyl group-containing monomer (A2), a hydroxyl group-containing monomer (A3) and, if necessary, other monomers.

Specific examples of the (meth)acrylic acid alkyl ester (A1) having an alkyl group having a number of carbon atoms of 4 to 12 include n-butyl (meth)acrylate, isobutyl (meth)acrylate, 2-ethylhexyl (meth)acrylate, octyl (meth) acrylate, isooctyl (meth)acrylate, isononyl (meth)acrylate and lauryl (meth)acrylate. The content of the (meth)acrylic acid alkyl ester (A1) is preferably 85% by mass or more, more preferably 87.5% by mass or more, particularly preferably 90% by mass or more, in 100% by mass of constitutional components (monomer units) of the acrylic copolymer (A).

Specific examples of the carboxyl group-containing monomer (A2) include (meth)acrylic acid, itaconic acid, crotonic acid, (anhydrous) maleic acid, fumaric acid, 2-carboxy-1-butene, 2-carboxy-1-pentene, 2-carboxy-1-hexene and 2-carboxy-1-heptene. The content of the carboxyl group-containing monomer (A2) is preferably 0.5 to 10% by mass, more preferably 1 to 7% by mass, particularly preferably 1 to 5% by mass, in 100% by mass of constitutional components (monomer units) of the acrylic copolymer (A).

Specific examples of the hydroxyl group-containing monomer (A3) include 2-hydroxyethyl (meth)acrylate, 3-hydroxypropyl (meth)acrylate and 4-hydroxybutyl (meth) acrylate. The content of the hydroxyl group-containing monomer (A3) is preferably 0.05 to 10% by mass, more preferably 0.07 to 7% by mass, particularly preferably 0.1 to 5% by mass, in 100% by mass of constitutional components (monomer units) of the acrylic copolymer (A).

As the other monomer, vinyl acetate and acryloylmorpholine are preferable. The content of vinyl acetate is preferably 0.1 to 10% by mass, in 100% by mass of constitutional components (monomer units) of the acrylic copolymer (A). The content of acryloylmorpholine is preferably 0.1 to 10% by mass, in 100% by mass of constitutional components (monomer units) of the acrylic copolymer (A). Further, as the other monomer, (meth)acrylic acid alkyl esters (A4) having an alkyl group having a number of carbon atoms of 1 to 3 such as methyl (meth)acrylate, ethyl (meth)acrylate and propyl (meth)acrylate may also be used.

The acrylic copolymer (A) may contain, as the constitutional component, monomers other than the monomers exemplified above.

In the acrylic adhesive, cross-linking agents having reactivity with a functional group of the acrylic copolymer are generally used. As the cross-linking agent, for example, isocyanate compounds, acid anhydrides, amine compounds, epoxy compounds, metal chelates, aziridine compounds and melamine compounds can be used. The addition amount of the cross-linking agent is usually 0.01 to 5 parts by mass, preferably 0.05 to 3 parts by mass, with respect to 100 parts by mass of the acrylic copolymer.

In the acrylic adhesive, if necessary, rosin-based, terpene-based, petroleum-based, coumarone-indene-based, pure monomer-based, phenol-based or xylene-based tackifiers resins; softeners including mineral oils such as paraffin-based process oils, polyester-based plasticizers and vegetable oils; aromatic secondary amine-based, monophenol-based, bisphenol-based, polyphenol-based, benzimidazole-based or phosphorus acid-based antioxidants may be added. Further, the saturated hydrocarbon resins described previously may also be compounded.

The kind of the silicone-based adhesive is not particularly restricted, and various known silicone-based adhesives containing a silicone component as the main component can be used. The silicone component includes, for example, silicone rubbers and silicone resins containing an organopolysiloxane as the main component. It may be permissible that a catalyst such as a platinum catalyst, and a cross-linking agent such as a siloxane-based cross-linking agent and a peroxide-based cross-linking agent are added to such a silicone component, and they are crosslinked and polymerized. Further, the saturated hydrocarbon resins described previously may also be compounded.

In the adhesives described above, if necessary, other components may further be contained. Specific examples thereof include solvents such as toluene; additives such as an antioxidant, an ultraviolet absorber, a light stabilizer and an antistatic agent; and fillers or pigments such as carbon black, calcium oxide, magnesium oxide, silica, zinc oxide and titanium oxide.

The adhesive layer can be formed, for example, by coating an adhesive on a base, and causing a crosslinking reaction thereof with heating. A primer layer may be disposed between the base and the adhesive layer. As the primer, for example, a primer containing a polymer containing a polar group introduced by modification with an acid, and/or containing an acid component can be used. Specific examples thereof include polymers containing a polar group introduced by graft modification using a carboxyl group-containing monomer (for example, unsaturated monocarboxylic acids such as acrylic acid and methacrylic acid; unsaturated dicarboxylic acid monoesters such as maleic acid monomethyl ester) or an acid anhydride group containing monomer (for example, maleic anhydride). The kind of the polymer to be modified is not particularly restricted, and poyolefin-based polymers such as polypropylene-based polymers and polyethylene-based polymers are particularly preferable. Specific examples of the acid component used in the primer layer include organic acids such as organic sulfonic acids and carboxylic acids; and inorganic acids such as sulfuric acid, hydrochloric acid and phosphoric acid. Of them, acid-modified polyolefin-based polymers are preferable, and acid-modified polypropylene-based polymers are more preferable. The thickness of the primer layer is preferably 0.01 to 3 μm, more preferably 0.1 to 2 μm, particularly preferably 0.2 to 1 μm.

A mold-releasing agent may be coated on one surface of the base of the adhesive tape of the present invention (surface opposite to the surface where the adhesive layer is provided). The kind of the mold-releasing agent is not particularly restricted, and known various mold-releasing agents can be used. Specific examples of the mold-releasing agent include long chain alkyl-based and silicone-based mold-releasing agents.

[Adhesive Tape]

The adhesive tape of the present invention has a base and an adhesive layer provided on one surface of the base. The thickness of the adhesive tape is 30 μm or less, preferably 2.1 to 30 μm, more preferably 3.0 to 25 μm, particularly preferably 3.5 to 20 μm. Reducing the thickness of the adhesive tape in this way can contribute to miniaturization of various products (for example, batteries) requiring miniaturization.

The peel adhesion of the adhesive tape in accordance with JIS Z 0237:2000 is 0.50 N/10 mm or more, preferably 0.70 to 3.00 N/10 mm, more preferably 0.90 to 2.00 N/10 mm. Since the adhesive tape of the present invention has such sufficient peel adhesion even if the adhesive layer is thin, problems regarding fixability of members hardly occur. In the case of formation of an adhesive layer with a rubber-based adhesive composition, the peel adhesion can be controlled, for example, by the kind of a rubber component, the kind of a saturated hydrocarbon resin, the kinds of other compounding components, and the compounding ratio of these components. In the case of formation of an adhesive layer with an acrylic adhesive, the peel adhesion can be controlled, for example, by the kind of an acrylic copolymer, the kind of a cross-linking agent, the kinds of other compounding components, and the compounding ratio of these components. In the case of formation of an adhesive layer with a silicone-based adhesive, the peel adhesion can be controlled, for example, by the kind of a silicone rubber, the kind of a silicone resin, the kind of a catalyst, the kind of a cross-linking agent, the kinds of other compounding components, and the compounding ratio of these components.

The strength to repel members of the adhesive tape calculated by the following formula is 70 MPa·mm or less, preferably 5 to 65 MPa·mm, more preferably 10 to 60 MPa·mm, particularly preferably 15 to 50 MPa·mm. By controlling the strength to repel members of the adhesive tape to such a relatively low level, followability to members is improved.

$$\text{Strength to repel members (MPa·mm)=tensile elastic modulus (MPa) of adhesive tape×thickness (mm) of adhesive tape}$$

In the above-described formula, the tensile elastic modulus of the adhesive tape is measured in accordance with JIS K 7161:2014. The specific measurement method thereof will be described in detail in the section of examples. By using a relatively thin base having relatively low tensile elastic modulus, the stiffness of the adhesive tape becomes weak, and followability to members tends to be improved.

The adhesive tape may be a so-called dry edge type adhesive tape having a non-adhesive portion having no adhesive layer at one end or both ends in the width direction. The non-adhesive portion is a portion where an adhesive layer is not formed on a base. When this non-adhesive portion is provided, protrusion of an adhesive does not easily occur, so the adhesive tape is, for example, very useful for battery applications. Moreover, since this portion becomes a grip margin at the time of peeling an adhesive tape, it becomes easy to peel it off. The width of the non-adhesive portion is preferably 0.5 mm or more, more preferably 1.0 mm or more, particularly preferably 2.5 mm or more from the end of the base.

The adhesive layer of the adhesive tape may be a layer in which an adhesive portion wherein an adhesive is present and a non-adhesive portion wherein an adhesive is not present are mixed. The pattern of mixing of the adhesive portion and the non-adhesive portion is not particularly restricted, and it is preferable that the adhesive portion is island-shaped or streaked. However, the adhesive portion is not limited to a regularly arranged pattern, and may be a randomly mixed pattern. The island shape includes, for example, a square shape, a triangular shape and a polygonal shape, and the square shape is preferable since it can ensure the area of the adhesive portion most efficiently, and also preferable from the standpoint of vertical and horizontal isotropy as compared with the streaky adhesive portion. The streaky shape is not limited to a linear arrangement, and may be, for example, a wavy line or a broken line. When an adhesive portion and a non-adhesive portion are mixed in the adhesive layer, the ratio of the area of the adhesive portion is preferably 40 to 95%, more preferably 50 to 95%.

The adhesive tape preferably has a smaller dimensional change due to heating. If the dimensional change due to heating is small, the adhesive tape will not peel off even if it is used in places that may become hot such as, for example, the inside of a battery that becomes hot by repeated charging and discharging, and the insulation tends to be maintained. For example, the dimensional change rate on heating measured by the following method is preferably 90% or more, more preferably 95% or more, and particularly preferably 97% or more.

(Dimensional Change Rate on Heating)

A test piece obtained by pasting an adhesive tape with a size of 10 mm×100 mm to an aluminum plate and pressing it is left in a 120° C. dryer for 2 hours, then, left at room temperature for 1 hour or more, and the dimension in MD (length) direction is measured, and the dimensional change rate on heating is calculated by the following formula.

$$\text{Dimensional change rate on heating (\%)=dimension in MD direction after heating/dimension in MD direction before heating×100(\%)}$$

The production method of the adhesive tape of the present invention is not specifically limited. In the case of using an acrylic adhesive, for example, first, the adhesive is coated on one surface of a base, and the solvent is removed by heating in a process such as drying to form an adhesive layer. Further, if necessary, a mold-releasing film made of, for example, a PET film coated with a mold-releasing agent may be pasted onto the adhesive layer.

The method for coating the adhesive is not particularly limited, and a method using, for example, roll coater, die coater, lip coater, Mayer bar coater or gravure coater can be used. The drying method of the adhesive is not particularly limited, and for example, a hot air drying method can be used.

EXAMPLES

The present invention will be illustrated further in detail by examples below, but the present invention is not limited to these examples.

Production Example of Acrylic Adhesive Composition

Cross-linking agents in amounts (parts by mass) shown in Table 1 were added to 100 parts by mass of an acrylic polymer containing monomers in proportions (% by mass) shown in Table 1 as the constitutional component, to obtain acrylic adhesive compositions Aa to Ad.

TABLE 1

|  |  | Pro. Ex. Aa | Pro. Ex. Ab | Pro. Ex. Ac | Pro. Ex. Ad |
|---|---|---|---|---|---|
| Adhesive | 2-ethylhexyl acrylat | 75 | 90 | 33 | 90 |
|  | n-butyl acrylate | 20 |  | 58 |  |
|  | vinyl acetate | 3 | 5 | 4.1 | 5 |
|  | acrylic acid | 2 | 3 | 4.8 | 3 |
|  | 4-hydroxybutyl acrylate |  | 0.1 |  | 0.1 |
|  | 2-hydroxyethyl acrylate |  |  | 0.1 |  |
|  | acryloylmorpholine |  | 1.9 |  | 1.9 |
| Cross-linking agent | CORONATE L | 3 |  | 1 |  |
|  | TETRAD C |  | 1 |  | 1.5 |

Abbreviations in Table 1 are as described below.
"CORONATE L": isocyanate-based cross-linking agent (manufactured by Tosoh Corp., CORONATE (registered trademark) L)
"TETRAD C": epoxy-based cross-linking agent (manufactured by Mitsubishi Gas Chemical Company, Inc., TETRAD (registered trademark) C)

Production Example of Rubber-Based Adhesive Composition

A rubber-based adhesive composition R containing 100 parts by mass of butyl rubber (manufactured by Exon Chemical Co., Ltd., trade name: BUTYL 365) and 40 parts by mass of hydrogenated petroleum resin (alicyclic saturated hydrocarbon resin)(manufactured by Arakawa Chemical Industries, Ltd., ARKON (registered trademark) P-100) as the main component was produced.

Examples 1 to 9 and Comparative Examples 1 to 4

Any one of the adhesive compositions Aa to Ad and R obtained in Production Examples was coated on one surface of bases having thicknesses shown in Tables 2 and 3, to form adhesive layers so that the thicknesses after drying were as shown in Tables 2 and 3. In Examples 1 to 3 and 5 to 9, adhesive layers were formed on the entire surface of one side of the bases, to obtain full-coated type adhesive tapes. In Example 4, an adhesive layer was formed only in a 3.5 mm inside region from both ends of one surface of the base, to obtain a dry edge type adhesive tape.

The peel adhesion and the strength to repel members of the adhesive tapes obtained in Examples and Comparative Examples were measured by the following methods. The results are shown in Tables 2 to 3.
<Peel Adhesion>
The peel adhesion at an angle of 180° with respect to a SUS plate was measured according to JIS Z 0237 (2000).
<Strength to Repel Members>
The strength to repel members of the adhesive tape was calculated by the following formula.

Strength to repel members (MPa·mm)=tensile elastic modulus (MPa) of adhesive tape×thickness (mm) of adhesive tape In the above-described formula, the tensile elastic modulus was determined as described below. First, the adhesive tape was cut into a strip shape (long side is MD direction) having a width (W) of 10 mm and a length of 100 mm, and this was adopted as a test piece. The thickness was measured with a 1/100 dial gauge (N=5), the average value of five points was taken as the thickness (t), and the crosssectional area (S) of the test piece was determined from the following equation.

Sectional area $S(mm^2)=t \times w$ t: tape thickness (mm)
W: width (mm)

Next, according to JIS K7161 2014, the chuck interval (L) of a commercially available tensile tester (manufactured by Toyo Seiki Seisaku-sho, Ltd., device name: STROGRAPH V-10C, full scale 50N) was set to 100 mm, and the upper and lower ends of the test piece were chucked. Then, pulling was performed at a tensile rate of 300 mm/min to obtain a tensile load-displacement curve, and a linear equation was obtained from the tensile loads at displacements of 0.05 mm and 0.25 mm of the tensile load-displacement curve. The tensile load F at a displacement of 1 mm was determined from this linear equation, and the tensile elastic modulus serving as an index of the stiffness of the tape was determined from the following equation.

Tensile elastic modulus $(MPa)=(F/S)/(x/L)$

F: tensile load=tensile load (N) at a displacement of 1 mm
S: Sectional area (m$^2$)
x: displacement=1 (mm)
L: chuck interval=100 (mm)

Further, the adhesive tapes obtained in Examples and Comparative Examples were evaluated by the following methods. The results are shown in Tables 2 to 3.
<Fixability of Members>
An adhesive tape was pasted to the polishing surface of waterproof polishing paper #2000, and this was peeled off manually, and fixability of members was evaluated by the following criteria.
A: The adhesive tape was not peeled off with slight force.
X: The adhesive tape was peeled off with slight force.
<Dimensional Change Rate on Heating>
An adhesive tape was cut into a size of 10 mm×100 mm, pasted to an aluminum plate and pressed, to obtain a test piece. This test piece was left in a 120° C. dryer for 2 hours, thereafter, left at room temperature for 1 hour or more, and the dimension in the MD (length) direction was measured, and the dimensional change rate on heating was calculated by the following formula.

Dimensional change rate on heating (%)=dimension after heating/dimension before heating×100

<Shrinkage after Heating>

The base after the above-described measurement of dimensional change rate on heating was confirmed visually, and the presence or absence of shrinkage was evaluated by the following criteria.

A: There was no change in the state of the base.

X: The upper and lower end portions of the base (locations cut to a length of 100 mm) were partially melted and shrunk to become resin lump-shaped end portions.

<Flowability to Members>

An adhesive tape was applied to the outer surface of an aluminum plate bent at 90° so as to cover the corners and pressed so that there was no gap, and this was adopted as a test piece. Here, the size of the adhesive tape was 10 mm in width and 100 mm in length, and most parts (99 mm in length) were pasted from the corner to one surface and only the remaining edge part (1 mm in length) was pasted from the corner to another surface. This test piece was left in a 70° C. dryer for 6 hours, thereafter, left at room temperature for 1 hour or more. According to the following criteria, followability to members was evaluated visually.

A: No gap was generated between the aluminum plate and the adhesive tape.

X: Gap was generated between the aluminum plate and the adhesive tape due to repulsion of the adhesive tape.

Abbreviations in Tables 2 and 3 are as described below.

"OPP": biaxially stretched polypropylene film (manufactured by Toray Industries, Inc., TORAYFAN (registered trademark))

"PET": polyethylene terephthalate film (manufactured by Toray Industries, Inc., LUMIRROR (registered trademark))

"PI": polyimide films (manufactured by Du Pont-Toray Co., Ltd., KAPTON (registered trademark))

"PPS": polyphenylene sulfide film (manufactured by Toray Industries, Inc., TORELINA (registered trademark))

"PE": low density polyethylene film (manufactured by Okura Industrial Co., Ltd., trade name: PE FILM TRANSPARENT)

<Evaluation Result>

As shown in Tables 2 and 3, the adhesive tapes of Examples 1 to 9 were thin, their peel adhesions were high and their strengths to repel members were low, thus, all evaluation items were also excellent.

In contrast, the adhesive tapes of Comparative Examples 1 and 2 were too thick and their strengths to repel members were high, so the followability to members was inferior.

The adhesive tapes of Comparative Examples 3 and 4 were inferior in the fixability of members due to low peel

TABLE 2

| | | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Adhesive layer | Type | Acrylic | Aa | Aa | | | Ab | Ab | Ac | Ac | |
| | | Rubber-based | | | R | R | | | | | R |
| | Thickness (μm) | | 5 | 5 | 10 | 5 | 5 | 5 | 2 | 2 | 5 |
| Base material | OPP (μm) | | 12 | 15 | 20 | 25 | | | | | |
| | PET (μm) | | | | | | 2 | | 6 | 12 | |
| | PI (μm) | | | | | | | | | | 12 |
| | PPS (μm) | | | | | | | 16 | | | |
| | PE (μm) | | | | | | | | | | |
| Measured value of adhesive tape | Tthickness (μm) | | 17 | 20 | 30 | 30 | 7 | 21 | 8 | 14 | 17 |
| | Peel adhesion (N/10 mm) | | 1.35 | 1.37 | 1.8 | 0.94 | 1.49 | 1.41 | 1.61 | 1.74 | 1.07 |
| | Dimensional change rate on heating (%) | | 99.9 | 99.9 | 99.6 | 99.0 | 99.9 | 99.7 | 99.9 | 99.9 | 99.8 |
| | Strength to repel members (Mpa · mm) | | 26 | 27 | 45 | 50 | 10 | 70 | 28 | 65 | 50 |
| Eevaluation | Fixability of members | | A | A | A | A | A | A | A | A | A |
| | Shrinkage after heating | | A | A | A | A | A | A | A | A | A |
| | Followability to members | | A | A | A | A | A | A | A | A | A |
| | Comprehensive evaluation | | A | A | A | A | A | A | A | A | A |

TABLE 3

| | | | Com. Ex 1 | Com. Ex. 2 | Com. Ex 3 | Com. Ex. 4 |
|---|---|---|---|---|---|---|
| Adhesive layer | Type | Acrylic | | | Ad | Ad |
| | | Rubber-based | R | R | | |
| | Thickness (μm) | | 8 | 19 | 2 | 2 |
| Base material | OPP (μm) | | | 40 | | |
| | PET (μm) | | | | | 6 |
| | PI (μm) | | 25 | | | |
| | PPS (μm) | | | | | |
| | PE (μm) | | | | 60 | |
| Measured value of adhesive tape | Tthickness (μm) | | 33 | 59 | 62 | 8 |
| | Peel adhesion (N/10 mm) | | 1.24 | 2.99 | 0.44 | 0.41 |
| | Dimensional change rate on heating (%) | | 99.7 | 99.9 | 99.6 | 99.9 |
| | Strength to repel members (Mpa · mm) | | 85 | 80 | 18 | 28 |
| Eevaluation | Fixability of members | | A | A | X | X |
| | Shrinkage after heating | | A | A | X | A |
| | Followability to members | | X | X | A | A |
| | Comprehensive evaluation | | X | X | X | X | adhesion. Additionally, the adhesive tape of Comparative Example 3 shrank after heating since PE (polyethylene film) was used as the base.

INDUSTRIAL APPLICABILITY

The adhesive tape of the present invention is thin and excellent in fixability of members and followability to members, so it is useful for an application of member fixation of various products requiring miniaturization, and particularly, very useful as a tape for battery. Specifically, the adhesive tape of the present invention can be used for various purposes such as core fixing, insulation of electrode outlet, end fixing and insulation spacer, in the production step of batteries such as secondary batteries (for example, a lead storage battery, a nickel-cadmium battery, a nickel hydrogen battery, a lithium ion battery). More specifically, for example, by using the adhesive tape of the present invention on the surface of a group of electrodes of a miniaturized or thinned battery or inside the battery case to maintain insulation, the safety of the battery can be ensured.

The invention claimed is:

1. An adhesive tape comprising a base and an adhesive layer provided on one surface of the base, wherein the base has a thickness of 2 to 12 μm, the adhesive layer has a thickness of 0.1 to 5 μm, the adhesive tape has a thickness of 17 μm or less, the adhesive tape has a peel adhesion of 0.50 N/10 mm or more in accordance with JIS Z 0237:2000, and the adhesive tape has a strength to repel members of 70 MPa·mm or less calculated by the following formula:

Strength to repel members (MPa·mm)=tensile elastic modulus (MPa) of adhesive tape×thickness (mm) of adhesive tape, wherein the adhesive layer comprises:
an acrylic copolymer (A) having a hydroxyl group and a carboxyl group, which is constituted by a (meth)acrylic acid alkyl ester (A1) having an alkyl group having a number of carbon atoms of 4 to 12, a carboxyl group-containing monomer (A2), and a hydroxyl group-containing monomer (A3), and
an isocyanate-based cross-linking agent.

2. The adhesive tape according to claim 1, wherein the base is a plastic film.

3. The adhesive tape according to claim 1, wherein a non-adhesive portion having no adhesive layer is provided at one end or both ends in the width direction.

4. The adhesive tape according to claim 1, wherein the dimensional change rate on heating measured by the following method is 90% or more:

A test piece obtained by pasting an adhesive tape with a size of 10 mm×100 mm to an aluminum plate and pressing it is left in a 120° C. dryer for 2 hours, then, left at room temperature for 1 hour or more, and the dimension in MD (length) direction is measured, and the dimensional change rate on heating is calculated by the following formula:

Dimensional change rate on heating (%)=dimension in MD direction after heating/dimension in MD direction before heating×100(%).

5. The adhesive tape according to claim 1, wherein the adhesive tape is an adhesive tape for battery.

6. The adhesive tape according to claim 1, wherein the base has a thickness of 3.5 to 12 μm.

* * * * *

Disclaimer

11,279,857 B2 - Takashi Edahiro, Tokyo (JP). ADHESIVE TAPE. Patent dated March 22, 2022. Disclaimer filed May 22, 2024, by the assignee, Teraoka Seisakusho Co. Ltd.

Hereby disclaims the term of this patent which would extend beyond Application No. 16/461717.

*(Official Gazette, October 8, 2024)*